United States Patent Office

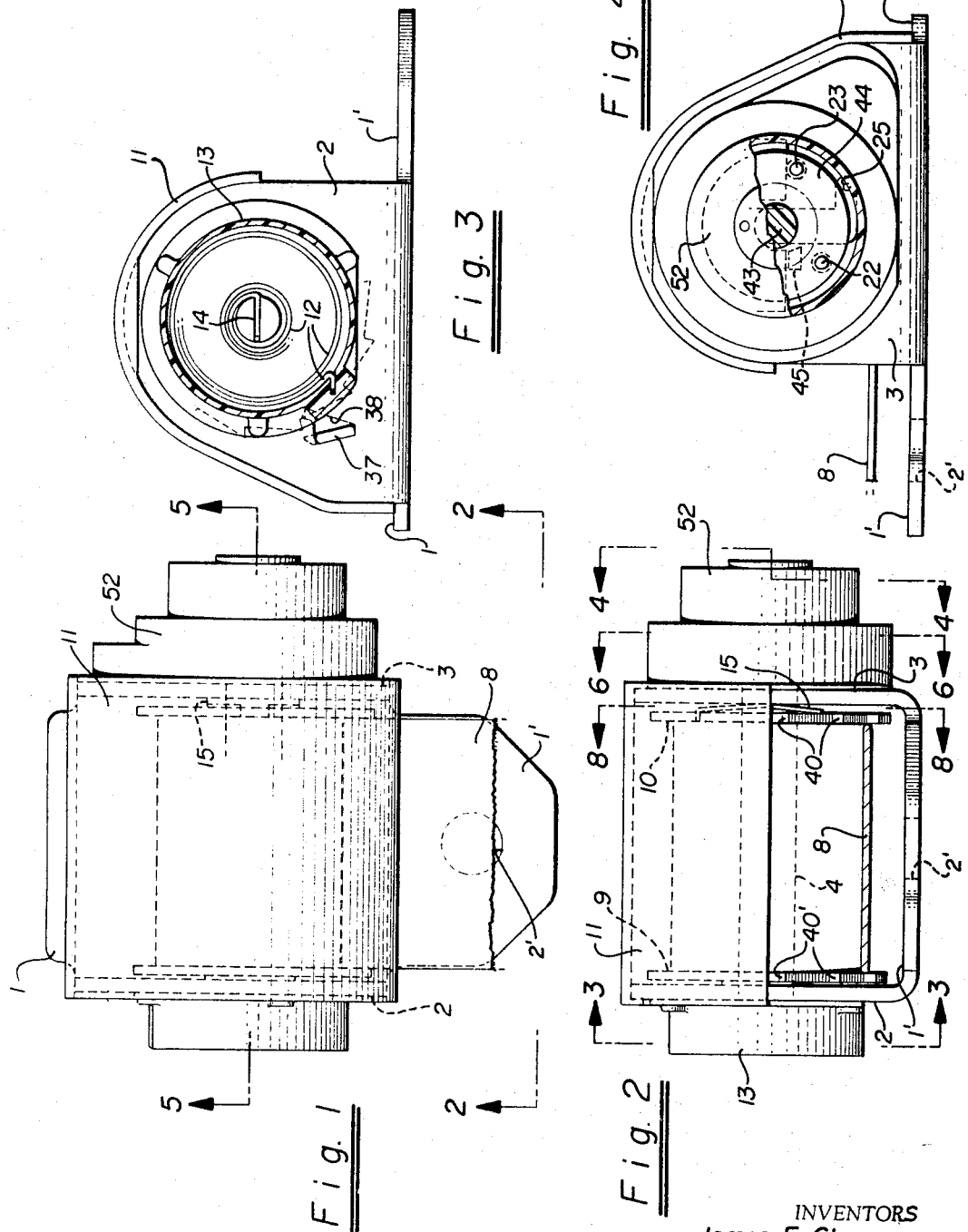

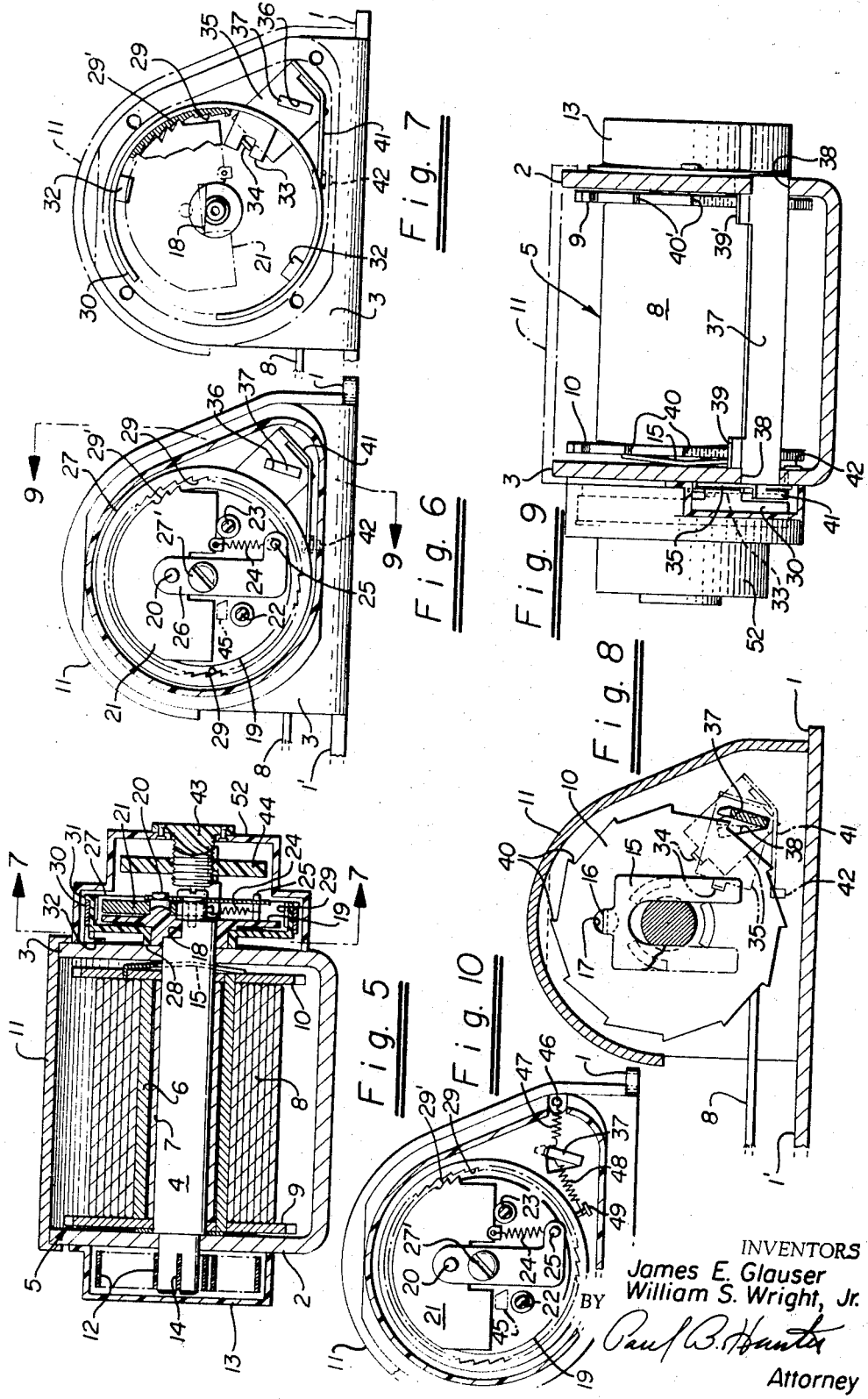

3,450,368
Patented June 17, 1969

---

3,450,368
SAFETY HARNESS DEVICE
James E. Glauser, Santa Ana, and William S. Wright, Jr., Orange, Calif., assignors to Pacific Scientific Company, City of Commerce, Calif., a corporation of California
Filed Aug. 15, 1967, Ser. No. 660,674
Int. Cl. B65h 75/48
U.S. Cl. 242—107.4                                                6 Claims

---

ABSTRACT OF THE DISCLOSURE

An inertia type safety harness device having a spindle with a harness strap wrapped around a reel fixed thereon together with a rewind spring for keeping the harness strap taut while allowing free movement of the user, an inertia semi-disc pivotally mounted at its center of gravity eccentrically of the spindle and turnable therewith due to a calibration spring means interconnecting the inertia member and spindle, excessive acceleration of the strap causing the inertia member to distend the spring means and actuate biasing spring mechanism to effect locking of the reel at both ends simultaneously, the reel automatically unlocking upon relieving the force on the strap, and further incorporating means for preventing locking of the reel during initial hand pull-out of the strap.

---

This invention relates generally to safety harness devices used on moving vehicles for protecting personnel against injury, and the invention has reference, more particularly, to a novel inertia responsive reel structure especially suitable for use on automobiles and other land vehicles and actuated by the user's harness strap for automatically retaining the user in his seat during crashes, sudden vehicle decelerations, and the like.

Safety harness devices of the general type herein involved have been developed over the years for use on aircraft, road and rail vehicles, etc. These devices generally combine a casing containing a spindle-supported reel mounted to turn and having a strap automatically wound thereon and unwound therefrom in response to movements of the user, such reel normally driving a spring loaded inertia member and cooperating locking means acting to lock the reel against rotation in case the strap, and hence the user, moves with respect to his seat at an excessive and dangerous acceleration.

Generally, these prior art devices are not entirely satisfactory because they tend to be complicated in structure and often employ expensive reel locking structures that are not always dependable in use. Furthermore, these earlier devices generally were position sensitive in that if they were not mounted in a substantially horizontal position, the effective weight of the spring loaded inertia member used varied so that the device would operate at a different acceleration from that set and hence became unreliable in use, and that is particularly objectionable in slower moving vehicles, helicopters, etc., where the G setting of the device is generally lower than that necessary in most aircraft.

Copending patent application Ser. No. 529,080, filed Feb. 21, 1966, now Patent No. 3,335,974, dated Aug. 15, 1967, in which William S. Wright, Jr., one of the inventors herein, is the applicant, discloses a safety harness device of such sensitivity that the same is especially useful on road vehicles and other slower moving vehicles such as helicopters wherein the G setting of the device may be appreciably lower than that used in most aircraft. This ability to operate reliably on a low G setting was due in part to a novel construction wherein the gripping means was made separate from the inertia mass and the weight of the inertia mass was so supported that it did not vary the G setting of the device regardless of the positioning of the device in the vehicle, whereas prior art devices did not have a reliable G setting when positioned on-end, for example.

The principal object of the present invention is to provide a novel safety harness device that is reliable in use, is inexpensive to manufacture, is position insensitive, and which can be set at relatively low acceleration rates including values of less than one-half G rate of the strap payout and will reliably perform time after time.

A novel feature of the invention is to provide a safety harness device employing an inertia member having teeth for engaging mating teeth on a preloaded clutch member that in turn acts upon the biasing spring means of a lock bar to effect the positive locking of both ends of the reel when the rate of withdrawal of the reel strap exceeds the set acceleration setting.

Another feature of the invention is to provide novel means for preventing the locking of the reel while the strap is initially being withdrawn from the reel to attach the same to the body of the user.

These and other features and advantages of the present invention will become more apparent after a perusal of the following specification taken in connection with the accompanying drawings wherein:

FIG. 1 is a plan view of the novel safety harness device of this invention;
FIG. 2 is a view taken along line 2—2 of FIG. 1;
FIG. 3 is a part sectional view taken along line 3—3 of FIG. 2;
FIG. 4 is a view taken along line 4—4 of FIG. 2;
FIG. 5 is a sectional view taken along line 5—5 of FIG. 1;
FIG. 6 is a sectional view taken along line 6—6 of FIG. 2;
FIG. 7 is a sectional view taken substantially along line 7—7 of FIG. 5;
FIG. 8 is a sectional view taken along line 8—8 of FIG. 2;
FIG. 9 is a view taken along line 9—9 of FIG. 6; and
FIG. 10 is a fragmentary view showing a modified structure.

Similar characters of reference are used in the above figures to designate corresponding parts.

Referring now to the drawings, the reference numeral 1 designates the frame member of the reel portion of the safety device, which frame member is of substantially U-shape having a base 1' that is adapted to be attached by a suitable fastener passing through an aperture 2 for attachment to a desired support in the vehicle, such as the back of the user's seat or to the vehicle frame or door jamb as where the device is used in a land vehicle such as an automobile. The upstanding legs or end walls 2 and 3 of the frame member 1 are provided with aligned bearing apertures for rotatably supporting a transversely extending reel 5 consisting of a spindle or shaft 4 and a surrounding spool 6, the shaft 4 having its end portions extending through the leg apertures. The hub of spool 6 is of substantially C-shaped cross-section with its inner surface somewhat spaced from the shaft 4 so as to accommodate the looped end 7 of a strap 8 which latter extends outwardly through the opening in the C-shaped spool hub portion in the manner disclosed in copending application Ser. No. 621,572, filed Mar. 8, 1967, now Patent No. 3,402,899, dated Sept. 24, 1968, in the names of William S. Wright Jr. et al. A portion of strap 8 is wrapped around the spool hub portion, being confined between guide flanges 9 and 10 fixed to the ends of this hub portion. A reel casing 11 carried by end walls 2 and 3 covers the reel 5. A portion of strap 8 is normally maintained in wrapped condition about the spool 6 by means of a spiral spring 12 that has its outer end fixed to the inner wall of a spring cup 13 attached to end wall 2 and its inner end fitted into a slot 14 provided in a reduced end portion of spindle 4. The spring 12 tends to wind the strap 8 upon the spool 6 by turning the reel 5, consisting of spindle 4 and spool 6, within the bearings in end walls 2 and 3. The free end portion of the strap 8 extends outwardly of the casting for attachment to the user's shoulder harness.

A U-shaped bowed spring member 15 is interposed between the guide flange 10 and end wall 3 with its legs engaged in slots provided in the sides of spindle 4 (see FIGS. 5 and 8), and presses against these members 10 and 3 to retain the spindle 4 in place within the reel. Also, spring member or retainer 15 has a bent-over lug 16 engaged in an aperture 17 in flange 10 to retain the spindle 4 and spool 6 assembled. The portion of spindle 4 projecting outwardly of end wall 3 is provided with a flat step at 18 conformably fitting into the non-circular hub aperture of a circular flange member 19, whereby this latter member turns with spindle 4 in use. Flange member 19 has a cylindrical boss 20 thereon radially offset from the axis of spindle 4, and a substantially semicircular inertia member or plate 21 is turnably mounted thereon with the axis of the boss 20 passing through the center of gravity of the inertia member 21. A pair of mutually spaced stop pins 22 and 23 project from flange member 19 adjacent the inertia member 21.

A coil calibration tension spring 24 has one end thereof connected to one edge of inertia member 21 at one side of the boss 20 and has its other end connected to a boss 25 proivded on flange member 19 and acts to normally hold inertia member 21 in abutting relation with stop pin 23. As will further appear, the tension of calibration spring 24 determines the G-setting of the safety harness device. The stop pin 22 is positioned on the other side of boss 20 and acts to limit turning movement of inertia member 21 during the locking operation of the reel. An L-shaped retainer plate 26 is shown attached as by a screw 27' to the end of spindle 4 and has apertures for passing over the ends of bosses 20 and 25 to thereby retain the inertia member 21 and calibration spring 24 in place.

A circular cup member 27 has a hub portion 28 turnably mounted on the hub of flange member 19 and extends radially outwardly and over the inertia member 21. The interior cylindrical surface of cup member 27 is provided wtih ratchet teeth 29 for cooperating with a pair of similar teeth 29' provided on the peripheral surface of inertia member 21. A split annular clutch spring 30 embraces the outer cylindrical surface of cup member 27. The outer edge of this split clutch spring 30 abuts an annular retaining boss 31 formed on cup member 27 and the inner edge of this clutch spring has spaced fingers 32 formed thereon for engaging the exterior surface of end wall 3 for retaining the clutch spring 30 on the cup member 27. The clutch spring 30 resiliently grips the peripheral surface of cup member 27 with a definite predetermined pressure. Thus, the clutch spring 30 and cup member 27 constitute a preloaded clutch, whereby the clutch spring 30 tends to turn with the cup member 27 but will slip thereon if held against turning by a force exceeding a predetermined amount.

Clutch spring 30 has a bifurcated lug 33 projecting therefrom, within the bifurcation of which is engaged the bent-over tongue 34 of a biasing spring lever member 35. Lever member 35 is of substantially rectangular flat shape and is provided with an inclined rectangular opening 36 for conformably receiving an end of a transversely extending lock bar 37 that is pivotally supported at its end portions in sector shaped apertures 38 provided in the reel end walls 2 and 3. Lock bar 37 has two teeth 39, 39' formed therein for respectively engaging teeth 40, 40' provided on the guide flanges 9 and 10. Lever member 35 has a narrow spring extension 41 that extends alongside end wall 2 and is provided with a bent-over end 42 that engages in a conforming opening provided in this end wall. Spring extension 41 acting through lever member 35 tends to turn lock bar 37 clockwise, as viewed in FIGS. 6, 7 and 8, within its supporting sector apertures 38 in end walls 2 and 3 to normally retain teeth 39, 39' out of engagement with teeth 40, 40'. The end of the safety harness device containing the inertia member 21 and associated parts is shown enclosed within a cover 52 that is provided with snap fasteners for retaining the same on the end wall 3.

In operation, during normal movements of the user, the strap 8 is pulled out by the user when he leans forward in his seat, causing spring 12 to yield and unwind the strap 8 from reel 5, the flange member 19 and the inertia member 21 carried thereby turning with the reel 5, and when the user moves back in his seat the spring 12 rewinds strap 8 upon the reel. However, in the event of a crash resulting in a sudden deceleration of the vehicle, the user's body tends to be thrown forward suddenly so that strap 8 starts to payout of the frame I with acceleration. Depending upon the tension of the calibration spring 24, if a predetermined dangerous acceleration of the user's body is reached, the inertia member 21 will tend to maintain its original velocity and hence will turn with respect to its pivotal support 20 on flange member 19, thus turning counter-clockwise as viewed in FIG. 6 away from stop pin 23 against the tension of calibration spring 24 so that its ratchet teeth 29' engage ratchet teeth 29 on the cup member 27 due to the eccentric mounting of this inertia member with respect to reel spindle 4. Thus, cup member 27 is now caused to turn clockwise within the reel, and clutch spring 30 turning therewith is caused through its bifurcated lug 33 to actuate biasing spring lever member 35 and connected lock bar 37 clockwise as viewed in FIGS. 6 through 8 so that teeth 39 and 39' of this lock bar engage teeth 40 and 40' of the reel and lock both ends of the reel simultaneously against further payout of the strap 8. With the reel thereby held firmly at both ends, the spindle 4 is relieved of high torsional loads which otherwise would occur were the reel locked at one end only, so that the device is capable of withstanding enormous strap loads in use. The lower dot-dash position of biasing spring lever 35 in FIG. 8 shows the lock position.

Should the teeth 39, 39' in moving to the locked position engage the tops of teeth 40, 40' so as not to lock instantly, the clutch spring 30 will slide momentarily over flange member 19 and enable lock bar teeth 39, 39' to hesitate momentarily and then move inwardly and fully engage the succeeding teeth 40, 40', so that no injury is caused to the locking mechanism. In practice, a typical reel of this invention has locked thousands of times without any malfunctioning.

Once the force on the strap 8 is relieved, then it will retract automatically through the action of the rewind spring 12. As the spring starts to rewind, the flange member 19 will start to turn counter-clockwise, as viewed in FIGS. 6 and 7, causing the teeth 29' of the inertia member to disengage the teeth 29 of the cup member 27, and the calibration spring will turn the inertia member back against the stop pin 23, and the spring extension 41 will turn spring lever 35 and connected lock bar 37 so that the latter disengages the reel teeth 40 and 40', placing the reel in condition for another locking operation when required. There is no possibility of the device locking during wind-up of the strap 8.

In the modified structure shown in FIG. 10, the clutch spring 30 and the biasing spring lever member 35 are eliminated, thus eliminating the preloaded clutch, and in its place there is employed a lock bar retraction spring 47 connected between the lock bar 37 and a pin 46 on end wall 3 for normally holding the lock bar in retracted position and out of engagement with the reel teeth 40, 40', together with an activator spring 48 connected between the lock bar 37 and a pin 49 on the periphery of the cup member 27. In case a locking operation of the reel takes place, the clockwise turning of cup member 27 due to the action of the inertia member 21 will cause activator spring 48 to stretch, and by overcoming the tension of retraction spring 47 cause the lock bar 37 to turn and lock against teeth 40, 40' of the reel. If the lock bar should strike the top of the teeth 40, 40', the spring 48 will stretch further temporarily until the lock bar rides against succeeding teeth 40, 40'. Once the force of the strap is relieved, it will be retracted by rewind spring 12 as before. The flange member 19 will start to turn counter-clockwise, as viewed in FIG. 10, causing teeth 29' of the inertia member to disengage teeth 29 of cup member 27, and the calibration spring 24 will turn the inertia member back against stop pin 23. The cup member 27 is free to turn counter-clockwise under tension of activator spring 48, allowing retraction spring 47 to turn lock bar 37 out of engagement with teeth 40, 40', placing the reel in condition for another locking operation when required.

When using the safety harness device on slower moving vehicles such as automobiles, it is often desired to set the same to lock at relatively low rates of acceleration of the strap payout. Rates as low as or lower than one-half the acceleration of gravity, i.e., ½ G are often desired. When a device is set at such low rates, it sometimes becomes difficult for the user to extend the fully stowed webbing or strap out across the body, because it will often lock with the initial hand pullout of the strap. To prevent this inconvenience, the novel safety harness device of this invention may be provided with means for preventing locking during this initial pullout. To this end, the cover 52 is provided with a central threaded stud 43 on which a nut 44 rides (see FIGS. 4 and 5). This nut 44 is shown having apertures for receiving reduced projecting end portions of stop pins 22 and 23 so that this nut turns with the reel spindle 4 and hence threads itself along the stud 43 in use. Nut 44 is so positioned on stud 43 that a beveled boss 45 thereon will substantially abut the edge of inertia member 21 during the initial pullout of the strap, thus preventing the turning of this inertia member on its supporting boss 20 and hence preventing the locking of the reel. After the strap has been passed across the user's body, the boss 45 on nut 44 will have traveled sufficiently toward the outer end of cap 42 to clear the inertia member 21, permitting this member to operate to effect locking of the device whenever necessary.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A safety harness device comprising a frame member, a transversely extending spindle rotatable in said frame member, a spool fixed upon said spindle and rotatable therewith, a strap wound on said spool, said strap extending outwardly of said frame member for connection to the body of the user, a rewind spring connected between said frame member and said spindle permitting unwinding of said strap and causing rewinding thereof during normal movements of the user in his seat, an inertia member carried by one end portion of said spindle, said inertia member being turnable on an axis extending through its center of gravity, said axis being parallel to though eccentric from the axis of said spindle, a cup member rotatably carried by said spindle, said inertia member and said cup member having cooperating gripping portions, a calibration spring carried by said spindle and connected to said inertia member for normally holding the gripping portions of said inertia member and said cup member out of engagement with each other, a lock bar pivotally supported by said frame member and positioned opposite said spool, said lock bar and said spool having cooperating teeth, and spring means acting to normally hold the teeth of said lock bar out of engagement with the teeth of said spool, said cup member being connected to said spring means, said inertia member acting, upon the acceleration of the strap outwardly of said frame member beyond a predetermined rate determined by the force of said calibration spring, to turn against the tension of said calibration spring and cause its gripping portion to engage that of said cup member, whereby the latter, acting through its connection with said spring means, overcomes the force of said spring means causing said lock bar to turn on its pivotal support so that its teeth engage those of said spool to lock said spool with respect to said frame member and thereby stop outward movement of the strap to retain the user in his seat.

2. A safety harness device as defined in claim 1 wherein a flange member is fixed on the end portion of said shaft carrying said inertia member, said flange member having an eccentric boss on which said inertia member is pivoted, said latter member extending transversly of said flange member and being turnable at its center of gravity on said boss, said calibration spring being connected between said flange member and said inertia member, said flange member having stop means for limiting the pivotal movement of said inertia member with respect to said flange member.

3. A safety harness device as defined in claim 2 wherein said cup member gripping portion comprises an annular peripheral interiorly toothed portion overlying said inertia member, the gripping portion of said inertia member comprising teeth thereon, said spring means comprising a retraction spring connected between said lock bar and said frame member, and an activator spring connected between said lock bar and said cup member, said activator spring yielding momentarily in the event said lock bar teeth strike the top of the teeth of said spool member during a locking operation.

4. A safety harness device as defined in claim 2 wherein said cup member gripping portion comprises an annular peripheral interiorly toothed portion overlying said inertia member, the gripping portion of said inertia member comprising teeth thereon, and a split annular clutch spring yieldably gripping the exterior surface of said cup member with a predetermined pressure, said clutch spring having a lug for engaging said spring means, said clutch spring slipping momentarily on said cup member in the event said lock bar teeth strike the top of the teeth of said spool during a locking operation causing said predetermined pressure to be exceeded.

5. A safety harness device as defined in claim 2 comprising an end cap covering said flange and inertia members, a threaded stud on said end cap aligned with said spindle, and a nut threaded on said stud and having a boss thereon projecting toward said inertia member, said nut being connected to said flange member for turning therewith, whereby during the initial hand pullout of said strap said boss acts to prevent the turning of said inertia member on its pivotal boss, thereby preventing the undesired locking of said device.

6. In a safety harness of the character described, having a frame member, a transversely extending spindle rotatable in said frame member, a spool fixed upon said spindle and rotatable therewith, a strap wound on said spool, said strap extending outwardly of said frame member for connection to the body of the user, a rewind spring connected between said frame member and said spindle permitting unwinding of said strap and causing rewinding thereof during normal movements of the user in his seat, an inertia member carried by one end portion of said spindle, means actuated by said inertia member upon excessive acceleration of said strap interiorly of said frame member for locking said spool and hence said strap against further movement, and comprising a threaded stud carried by said frame member and positioned in opposed relation to said inertia member, a nut threaded on said stud, and means connected for turning said nut with said spindle, said nut having a projection thereon projecting toward said inertia member for preventing the latter from effecting locking of said spool and strap during the initial hand pullout of said strap.

References Cited

UNITED STATES PATENTS 3,018,065  1/1962  Cushman et al. _____ 242—107.4

FOREIGN PATENTS 1,005,301  9/1965  Great Britain.

WILLIAM S. BURDEN, *Primary Examiner.*